(12) United States Patent
Aruga

(10) Patent No.: US 9,016,872 B2
(45) Date of Patent: Apr. 28, 2015

(54) PROJECTOR AND METHOD FOR PROJECTING IMAGE FROM PROJECTOR

(71) Applicant: Seiko Epson Corporation, Tokyo (JP)

(72) Inventor: Tadanori Aruga, Torrance, CA (US)

(73) Assignee: Seiko Epson Corporation, Tokyo (JP)

( * ) Notice: Subject to any disclaimer, the term of this patent is extended or adjusted under 35 U.S.C. 154(b) by 142 days.

(21) Appl. No.: 13/747,354

(22) Filed: Jan. 22, 2013

(65) Prior Publication Data

US 2013/0194554 A1 Aug. 1, 2013

(30) Foreign Application Priority Data

Jan. 27, 2012 (JP) ................................. 2012-015046

(51) Int. Cl.
*G03B 21/14* (2006.01)
*G03B 21/26* (2006.01)
*H04N 9/74* (2006.01)
*H04N 9/31* (2006.01)
*G09G 3/00* (2006.01)

(52) U.S. Cl.
CPC ............. *G03B 21/147* (2013.01); *G03B 21/14* (2013.01); *H04N 9/3182* (2013.01); *H04N 9/3194* (2013.01); *G09G 3/002* (2013.01); *G09G 2310/04* (2013.01); *G09G 2320/0626* (2013.01); *G09G 2360/145* (2013.01)

(58) Field of Classification Search
CPC ...................................................... G03B 21/26
USPC .......... 353/97, 28, 69, 70, 121; 348/586, 590, 348/607
See application file for complete search history.

(56) References Cited

U.S. PATENT DOCUMENTS

2006/0158425 A1* 7/2006 Andrews et al. ............... 345/156
2008/0106706 A1* 5/2008 Holmgren et al. ............. 353/121

FOREIGN PATENT DOCUMENTS

JP 2000-305481 A 11/2000

* cited by examiner

*Primary Examiner* — William C Dowling
*Assistant Examiner* — Ryan Howard
(74) *Attorney, Agent, or Firm* — ALG Intellectual Property, LLC

(57) ABSTRACT

A projector that modulates light emitted from a light source and projects the modulated image light on a projection surface, the projector including: an object detection unit for determining the position of an object that blocks projection of the image light; a distance detection unit for determining the distance to the object; and a projection control unit for determining an avoidance area where the object prevents the image light from reaching the projection surface based on the position of the object determined by the object detection unit and the distance to the object determined by the distance detection unit and projecting the image light in an area other than the avoidance area.

9 Claims, 6 Drawing Sheets

PROJECTOR AND METHOD FOR PROJECTING IMAGE FROM PROJECTOR

CROSS-REFERENCE

The entire disclosure of Japanese Patent Application No. 2012-015046 filed on Jan. 27, 2012, which is hereby incorporated by reference in its entirety.

BACKGROUND

1. Technical Field

The present invention relates to a projector and a method for projecting an image from the projector.

2. Related Art

When a person is present between a projector that is projecting an image on a projection surface and the projection surface, light radiated from the projector directly hits the person, who is dazzled by the light. To address the problem, there is a proposed technology for lowering the luminance of the light in an area where the light overlaps with the person to reduce the degree of dazzle felt by the person.

On the other hand, when the light hits the person in front of the projection surface, the person in front of the projection screen blocks a portion of an image on the projection surface and hence a person who is looking at the image cannot see the portion thereof. The problem also occurs when an object is present in front of the projection screen and blocks the light from the projector as well as in the case where a person is present in front of the projection screen. Such a situation is problematic because part of an image is invisible and information associated therewith is lost.

SUMMARY

An advantage of some aspects of the invention is to allow a person to satisfactorily view an image projected on a projection surface without loss of information even when an object that blocks light projection on the projection surface is present.

An aspect of the invention relates to a projector that modulates light emitted from a light source and projects the modulated image light on a projection surface. The projector includes an object detection unit that determines the position of an object that blocks projection of the image light, a distance detection unit that determines the distance to the object, and a projection control unit that determines an avoidance area where the object prevents the image light from reaching the projection surface based on the position of the object determined by the object detection unit and the distance to the object determined by the distance detection unit and projects the image light in an area other than the avoidance area.

According to the aspect of the invention, the projection is so performed that the area where the object blocks the image light projection is avoided. The projection can therefore be so performed that the projected image itself or information carried by the image are entirely visible without any loss.

Another aspect of the invention relates to the projector described above, wherein the projection control unit further includes a modulation unit that forms an image to be projected and modulates the light emitted from the light source based on the formed image, wherein the projection control unit deforms the entire image formed by the modulation unit in such a way that the deformed image avoids the avoidance area, and the projection control unit projects the image light in an area other than the avoidance area.

According to this aspect of the invention, the area where the object blocks the image light projection can be readily avoided by performing the image processing described above on the image formed by the modulation unit.

Still another aspect of the invention relates to the projector described above, wherein the projection control unit divides the image formed by the modulation unit into a plurality of images and project the image light in areas other than the avoidance area.

According to this aspect of the invention, even when the area where the obstacle blocks the image light projection is located in a primary position of the projection surface, such as in a position exactly in front of the projector, the image light can be projected in an area other than this area in such a way that all information contained in the projected image is visible.

Yet another aspect of the invention relates to the projector described above, wherein the projection control unit shrinks the image formed by the modulation unit to project the image light in an area other than the avoidance area.

According to this aspect of the invention, even when an elongated object (such as a person) extending in the vertical direction of the projection surface blocks the image light projection, for example, the projection can be so performed that the projected image is entirely visible.

Still yet another aspect of the invention relates to the projector described above, which further includes an imaging unit that captures an image of the projection surface, wherein the object detection unit determines the position of an object that blocks projection of the image light based on the image captured by the imaging unit, and the projection control unit determines an avoidance area where the object prevents the image light from reaching the projection surface based on the position of the object in the captured image and the distance to the object determined by the distance detection unit.

According to this aspect of the invention, since the area of the projection surface that is hidden by the object and where the projection is blocked can be accurately identified, the projection can be so performed that any influence of the object that blocks the image light projection can be reliably eliminated and a projected image is entirely visible.

Further another aspect of the invention relates to a method for using a projector that modulates light emitted from a light source and projects the modulated image light on a projection surface. The method includes determining the position of an object that blocks projection of the image light, determining the distance to the object, and determining an avoidance area where the object prevents the image light from reaching the projection surface based on the position of the object and the distance to the object and projecting the image light in an area other than the avoidance area.

According to this aspect of the invention, the projection is so performed that the area where the object blocks the image light projection is avoided. The projection can therefore be so performed that the projected image itself or information carried by the image are entirely visible without any loss.

According to the aspects of the invention, since the projection is so performed that the area where an object blocks the image light projection is avoided, the projection can be so performed that a projected image is entirely visible.

BRIEF DESCRIPTION OF THE DRAWINGS

The invention will be described with reference to the accompanying drawings, wherein like numbers reference like elements.

FIG. 3A shows a normal projection state, and FIG. 3B shows a projection state after avoidance projection in which projection is performed without interference with an obstacle.

DESCRIPTION OF EXEMPLARY EMBODIMENTS

An embodiment of the invention will be described below with reference to the drawings.

Figure 1:
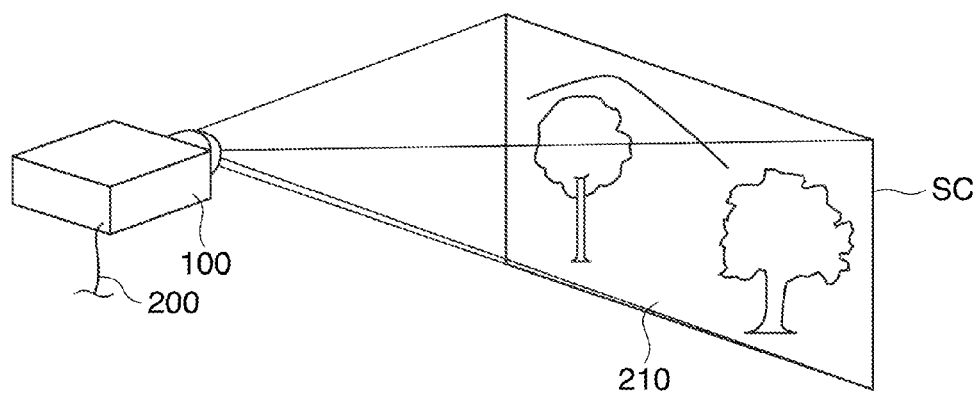
FIG. 1 is an exterior view showing an example of a projector in use according to an embodiment.

FIG. 1 is an exterior view showing an example of a projector 100 in use according to an embodiment to which the invention is applied.

In the example shown in FIG. 1, the projector 100 is installed in front of a screen SC (projection surface) and projects projection light toward the screen SC, and a projected image 210 is focused on the screen SC. The screen SC may simply be a wall surface or any other flat surface or may be attached to the floor, wall, or ceiling of a room.

The projector 100 is installed and a zoom magnification factor, which will be described later, and other parameters associated with the projector 100 are adjusted in such a way that the projected image 210 is focused in a projection area of the screen SC. The projector 100 is connected to an image supply apparatus (not shown) via a cable 200 and projects an image inputted from the image supply apparatus.

Figure 2:
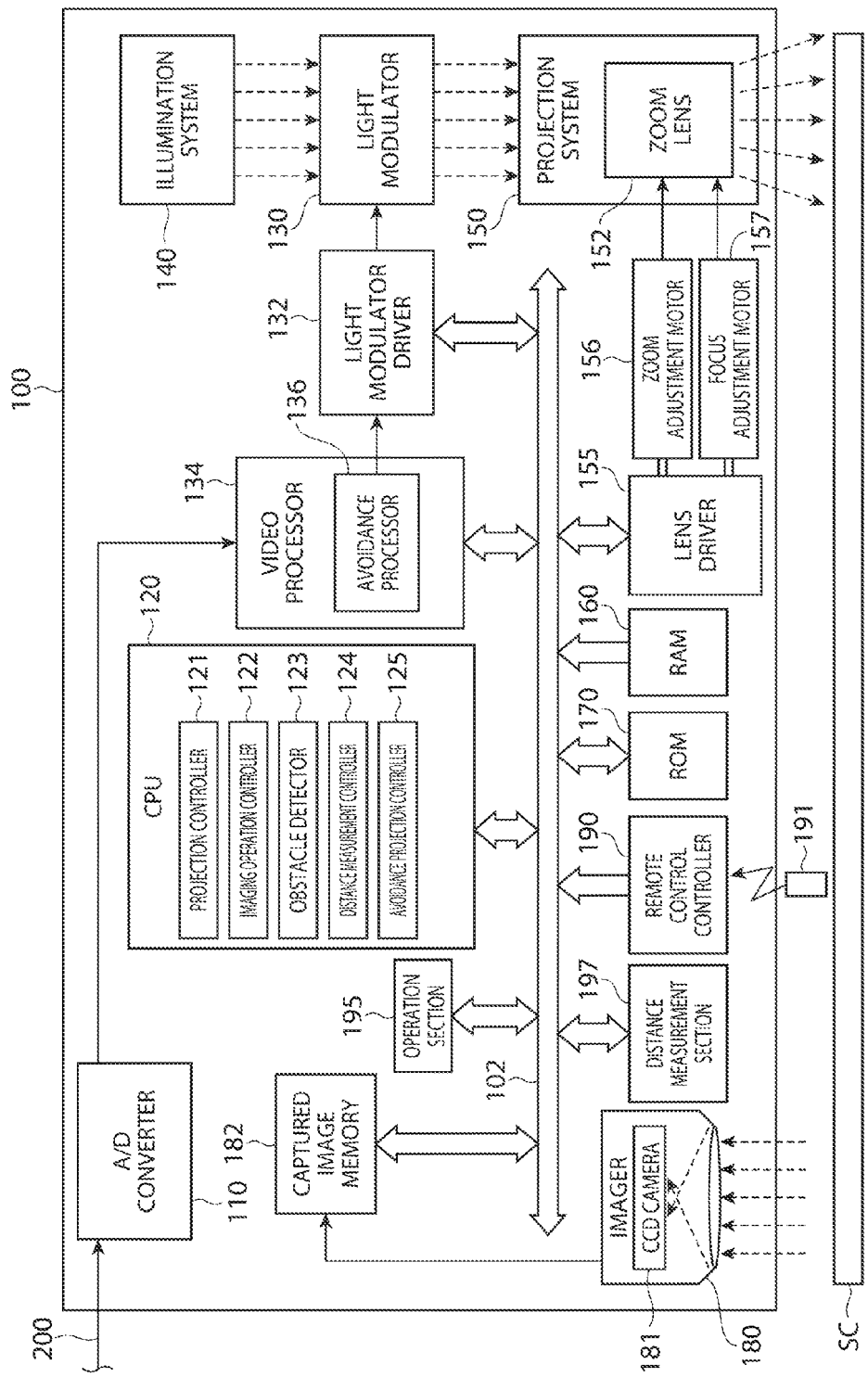
FIG. 2 is a block diagram showing a functional configuration of the projector.

FIG. 2 is a block diagram showing an overall configuration of the projector 100 according to the embodiment.

The projector 100 includes a USB interface, a wired or wireless LAN interface, a VGA terminal to which an analog video signal is inputted, a DVI (digital visual interface) to which a digital video signal is inputted, an S video terminal to which a composite video signal in the format of NTSC, PAL, SECAM, and any other standard is inputted, an RCA terminal to which a composite video signal is inputted, and a D terminal to which a component video signal is inputted, and an HDMI® connector that complies with the HDMI standard (any of the components described above is not shown) as an interface to which the image supply apparatus described above is connected and an interface circuit (not shown) that allows signals to be inputted and outputted via any of the terminals and the connectors described above, and the cable 200 is a cable appropriate for any of the interfaces described above. The projector 100 may alternatively be connected to the image supply apparatus via wireless communication.

Examples of the image supply apparatus described above may include a video reproducing apparatus, a DVD reproducing apparatus, a television tuner, a CATV set top box, a video game console and any other image output apparatus, and a personal computer (PC). The projector 100 is capable of not only projecting video images (motion pictures) on the screen SC but also keeping projecting a still image on the screen SC. The projector 100 can alternatively accommodate a storage device and project video images from a video source (not shown) stored in the storage device.

The projector 100 is broadly divided into an optical system that forms an optical image and an image processing system that electrically processes a video signal. The optical system, which functions as a projection section, includes an illumination system 140 (light source), a light modulator 130 (modulation unit), and a projection system 150 (projection unit). The illumination system 140 includes a light source formed, for example, of a xenon lamp, an ultrahigh-pressure mercury lamp, or an LED (light emitting diode). The illumination system 140 may further include a reflector and an auxiliary reflector that guide the light emitted from the light source to the light modulator 130 and a group of lenses (not shown) for enhancing optical characteristics of the projection light, a polarizer, or a light controlling device that is disposed in a position along the path extending to the light modulator 130 and attenuates the light emitted from the light source.

The light modulator 130 is formed, for example, of a transmissive liquid crystal panel, which receives a signal from the image processing system, which will be described later, to form an image. The light modulator 130, for example, includes three liquid crystal panels corresponding to three primary colors RGB in order to project a color image. The light from the illumination system 140 is separated into three RGB color light fluxes, which are incident on the liquid crystal panels corresponding thereto. The color light fluxes pass through the liquid crystal panels, where the color light fluxes are modulated and then combined by a cross dichroic prism or any other light combining system to form image light, which is then delivered to the projection system 150.

The light modulator 130 does not necessarily include three transmissive liquid crystal panels but may, for example, include three reflective liquid crystal panels, a combination of a single liquid crystal panel and a color wheel, three digital mirror devices (DMDs), or a combination of a single digital mirror device and a color wheel. When only one liquid crystal panel or DMD is used as the light modulator 130, a member corresponding to the cross dichroic prism or any other light combining system is not required. Further, any configuration capable of modulating the light emitted from the light source other than a liquid crystal panel or a DMD can be used without any problem.

The projection system 150 includes a zoom lens 152 that magnifies or demagnifies an image to be projected and performs focus adjustment; a zoom adjustment motor 156 that adjusts the zooming factor; and a focus adjustment motor 157 that adjusts focusing. The projection system 150 receives the light modulated by the light modulator 130 and uses the zoom lens 152 to focus a projected image on the screen SC. The zoom lens 152, in which the positions of lenses therein and other parameters are adjusted by the zoom adjustment motor 156 and the focus adjustment motor 157, performs zoom adjustment in which an image projected on the screen SC is magnified or demagnified and focus adjustment in which the projected image is exactly brought into focus on the screen SC.

A lens driver 155 drives the zoom adjustment motor 156 and the focus adjustment motor 157 for zoom magnification adjustment and focus adjustment under the control of a CPU 120.

The image processing system is primarily formed of the CPU 120, which oversees and controls the entire projector 100, and a video processor 134 and specifically includes an A/D converter 110, a light modulator driver 132, the lens driver 155, a RAM 160, a ROM 170 including a distortion adjustment image storage section 171, an imager 180 including a CCD camera 181, a captured image memory 182, a remote control controller 190, a remote control 191, and an operation section 195. The elements that form the image processing system are connected to each other via a bus 102.

The A/D converter 110 converts an analog input signal inputted from the external image supply apparatus described above via the cable 200 into digital image data and outputs the digital image data to the video processor 134. The video processor 134 adjusts the digital image data inputted from the A/D converter 110 in terms of brightness, contrast, color density, color tone, and the shape and other display states of an image to be projected and then outputs a video signal that reflects the processing described above to the light modulator driver 132. The light modulator driver 132 drives the light modulator 130 based on the video signal inputted from the video processor 134 and controls the liquid crystal panels or other devices provided in the light modulator 130 to draw an image. The light which is outputted from the illumination system 140 and with which the light modulator 130 is irradiated is thus modulated, and the modulated light is projected through the projection system 150 on the screen SC. Video images corresponding to the video signal inputted to the A/D converter 110 are thus formed as the projected image 210 (FIG. 1) on the screen SC.

The video processor 134, which performs image processing, such as brightness, contrast, and color tone correction described above, also performs avoidance projection when an obstacle is present in front of the screen SC by using an avoidance processor 136. The avoidance projection, in which video images are projected without interference with the obstacle, will be described later. The video processor 134 can be formed of a general-purpose processor commercially available as a DSP (digital signal processor) or can be formed of a dedicated ASIC.

The CPU 120, along with the video processor 134, is responsible for the image processing in the projector 100. The CPU 120 includes a projection controller 121, an imaging operation controller 122, an obstacle detector 123, a distance measurement controller 124, and an avoidance projection controller 125. The components described above are achieved by the CPU 120 that executes a specific program stored in the ROM 170 in advance.

When the projector 100 is turned on and starts image projection, the projection controller 121 controls not only the image projection operation but also execution of the avoidance projection, which will be described later, by using the imaging operation controller 122, the obstacle detector 123, the distance measurement controller 124, and the avoidance projection controller 125.

The imaging operation controller 122 controls imaging operation of the imager 180. The projector 100 uses an image captured by the imager 180 in the avoidance projection, which will be described later.

The obstacle detector 123 (object detection unit) detects in the avoidance projection an obstacle contained in the captured image captured under the control of the imaging operation controller 122. Specifically, the position of the obstacle in the captured image is detected. An obstacle used herein is a person or an object that is located between the screen SC and the projector 100 and blocks the projection. In detail, an obstacle refers to what blocks or attenuates the light projected from the projector 100 toward the screen SC in such a way that an original image focused on the screen SC changes. Even a transparent object that reflects or refracts image light projected from the projector 100 in such away that an image focused on the screen SC changes is an obstacle. The obstacle detector 123 detects an obstacle located in front of the screen SC by comparing a projected image contained in captured image data acquired by the imager 180 with an image being projected under the control of the projection controller 121.

When the obstacle detector 123 detects an obstacle located in front of the screen SC, the distance measurement controller 124 instructs a distance measurement section 197 to measure the distance to the obstacle. The distance measurement section 197 is a sensor that uses laser light or infrared light to measure the distance to a subject and is oriented in the projection direction in which the projection system 150 projects image light. The distance measurement section 197 measures the distance to an object (including a person) present in the projection direction of the projection system 150 and outputs the measurement to the CPU 120 under the control of the distance measurement controller 124. The distance measurement controller 124 functions not only as the distance measurement section 197 but also as a distance detection unit.

When the obstacle detector 123 detects an obstacle, the avoidance projection controller 125 controls the avoidance projection, which is projection without interference with the obstacle. The avoidance projection is a process of identifying an area on the screen SC that is hidden by an obstacle detected by the obstacle detector 123 based on the position of the obstacle, the distance to the obstacle, and the projection distance to the screen SC and performing projection in an area other than the identified area. Specifically, the avoidance projection controller 125 changes an image formed in the light modulator 130 in such a way that the image is not projected in the area hidden by the obstacle but is projected only in the remaining area. To this end, the avoidance processor 136 provided in the video processor 134 corrects the image under the control of the avoidance projection controller 125. The avoidance projection controller 125, along with the avoidance processor 136, functions as projection control unit. The avoidance projection will be described later in detail.

The RAM 160 provides a work area that temporarily stores programs executed by the CPU 120 and data used by the CPU 120. The video processor 134 has a work area as a built-in RAM necessary when the video processor 134 itself adjusts states of a displayed image and carries out other processes.

The ROM 170 stores, for example, programs executed by the CPU 120 to provide the processing components described above and data associated with the programs. The ROM 170 also stores adjustment image data to be projected on the screen SC in trapezoidal distortion correction, which will be described later, in the adjustment image storage section 171.

The operation section 195 is disposed in the body of the projector 100 and has switches operated by a user and a variety of other operation parts and indicator lamps. Under the control of the CPU 120, the indicator lamps on the operation section 195 go on or off as appropriate in accordance with the operation and settings of the projector 100, and the operation section 195 outputs an operation signal in response to operation made through any of the operation parts. The remote control controller 190 receives a wireless signal transmitted from the remote control 191 external to the projector 100. The remote control 191 has operation parts (not shown) operated by the user and transmits an operation signal according to operation made through any of the operation parts in the form of infrared signal or wireless signal using electric radiation of a predetermined frequency. The remote control controller 190, which includes a light receiver (not shown) that receives the infrared signal or a reception circuit (not shown) that receives the wireless signal, receives a signal transmitted from the remote control 191, analyzes the received signal, produces a signal representing the user's operation, and outputs the signal to the CPU 120.

The imager 180 (imaging unit) includes the CCD camera 181 using a CCD, which is a known image sensor. The imager 180 is disposed in the front surface of the projector 100, that is, in a position where the CCD camera 181 can perform imaging in the direction in which the projection system 150 projects video images toward the screen SC. The direction and viewing angle of the CCD camera 181 in the imager 180 are so set that an entire projected image projected on the screen SC located at a recommended projection distance falls at least within the image capturing range of the CCD camera 181.

The imager 180 performs imaging under the control of the imaging operation controller 122. The imager 180 sets the shutter speed in accordance with control data inputted from the imaging operation controller 122 and instructs the CCD camera 181 to perform imaging at the thus set shutter speed at the timing specified by the imaging operation controller 122.

The CCD camera 181 includes not only a CCD but also a single-focus lens that forms video images on the CCD, an auto-iris mechanism that adjusts the amount of light incident on the CCD and other mechanisms, and a control circuit that reads a video signal from the CCD. The auto-iris mechanism receives from the control circuit a signal corresponding to accumulated brightness of video images from the CCD camera 181 and automatically adjusts an iris (diaphragm) provided in the vicinity of the single-focus lens in such a way that the accumulated brightness falls within a predetermined range.

An image having undergone the brightness adjustment using the auto-iris mechanism is outputted from the imager 180 to the captured image memory 182 and repeatedly written to a predetermined area of the captured image memory 182. Whenever the writing operation of an image corresponding to a single screen is completed, the captured image memory 182 successively reverses a flag associated with the predetermined area. Referring to the flag, the imaging operation controller 122 can recognize whether or not the imager 180 has completed imaging operation. The imaging operation controller 122 accesses the captured image memory 182 while referring to the flag and acquires a necessary captured image.

Figure 3A:
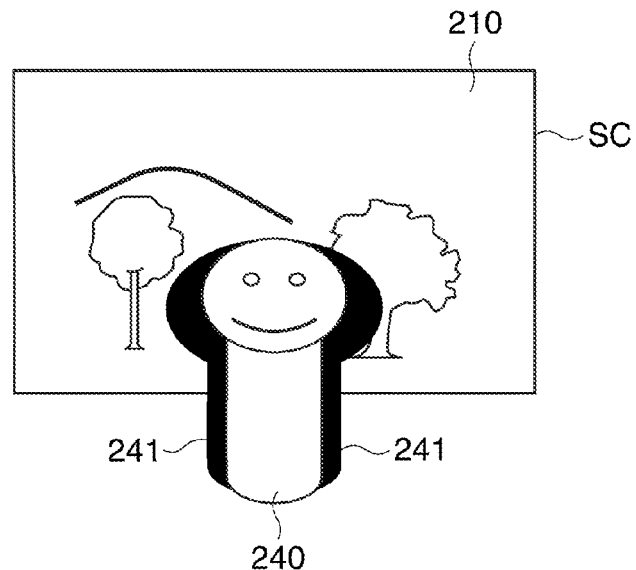
FIGS. 3A and 3B are descriptive diagrams showing exemplary projection states.
Figure 3B:
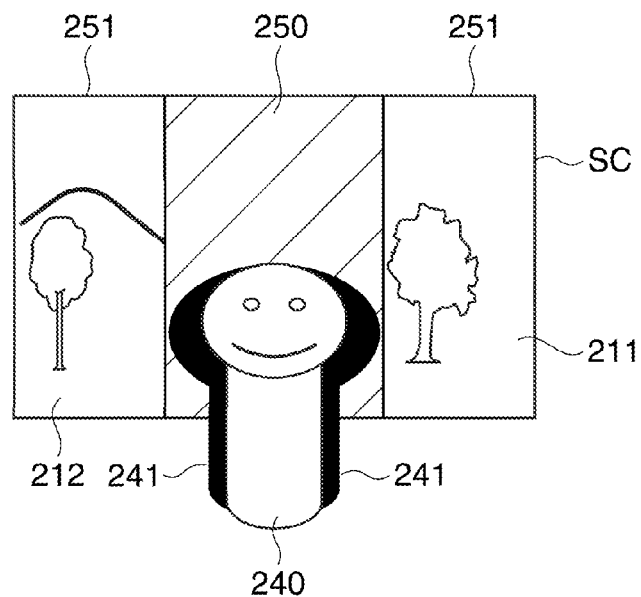

FIGS. 3A and 3B are descriptive diagrams showing exemplary projection states. FIG. 3A shows a normal projection state, and FIG. 3B shows a projection state after the avoidance projection, in which projection is performed without interference with an obstacle.

When a person 240 is present as an obstacle in front of the screen SC, the person 240 hides a large portion of the projected image 210 focused on the screen SC, as shown in FIG. 3A. The reason for this is that projection performed by the projector 100 disposed in front of the screen SC as described with reference to FIG. 1 produces a shadow 241 of the person 240 located in front of the screen SC on the screen SC.

To address the problem, having detected that the person 240 is present, the projector 100 performs the avoidance projection. In the avoidance projection, the area of the projected image 210 that is hidden by the presence of the person 240 in consideration of the influence of the shadow 241 of the person 240 is determined as an avoidance area 250. The projector 100 then projects an image in an area 251 that does not contain the avoidance area 250. When the area 251 is smaller than the projected image 210, which is an original image to be projected on the screen SC, the image is demagnified (shrunk) and projected in the area 251. When the avoidance area 250 divides a projectable area of the screen SC into a plurality of areas, the projected image 210 is divided before projected, as shown in FIG. 3B.

Although the avoidance area 250 is arbitrarily shaped, the projector 100 according to the present embodiment forms a rectangular avoidance area 250 extending in the vertical direction across the screen SC, as shown in FIG. 3B. In this case, although the person 240 will not hide at least an upper portion of the avoidance area 250, the following advantages are provided as compared with a case where a minimum area hidden by the person 240 and the shadow 241 is set to be the avoidance area 250: no computation in the height direction is required; better visibility is provided because the projected image 210 is shrunk only in the horizontal (transverse) direction; and so on. In the present embodiment, the size of the avoidance area 250 in the height direction is therefore set to be equal to the size of the screen SC (or projectable area of screen SC). When the configuration of the projector 100 allows computation in the height direction to be performed, an avoidance area 250 that is not uniformly shaped in the vertical direction of the screen SC may be set, and an image may be projected in an area other than the avoidance area 250.

Figure 4:
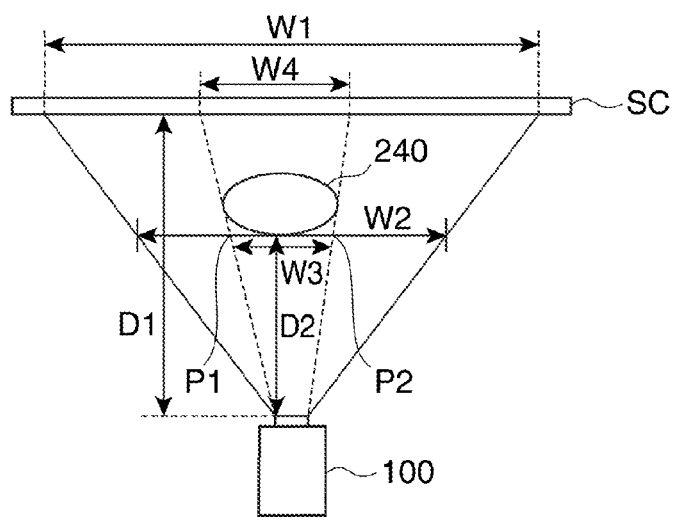
FIG. 4 is a diagrammatic view showing an example of the positional relationship between an obstacle and the projector.

FIG. 4 is a diagrammatic view showing an example of the positional relationship between an obstacle and the projector 100. The avoidance projection will be described in detail with reference to FIG. 4.

In the avoidance projection, the avoidance projection controller 125 calculates the projection distance D1 from the projector 100 to the screen SC and the size W1 of the projection range (projected image) on the screen SC based on the zoom magnification factor of the zoom lens 152 and information on optical characteristics specific to the projector 100.

The avoidance projection controller 125 further instructs the distance measurement controller 124 to measure the distance D2 from the projector 100 to the person 240, who is an obstacle, and acquires the measurement from the distance measurement controller 124.

The avoidance projection controller 125 uses the function of the obstacle detector 123 to determine the positions P1 and P2 of both ends of an image of the person 240 in a captured image captured by the imager 180. The avoidance projection controller 125 thus determines the size W3 between the positions P1 and P2 of the two ends.

The avoidance projection controller 125 then determines the size W4 of the avoidance area and the position thereof on the screen SC based on the size W1 of the projection range, the projection distance D1, the positions P1 and P2 of the two ends, and the size W3. The avoidance projection controller 125 further determines the size W2 of the image light projection range in the position of the person 240.

The avoidance projection controller 125 subsequently controls the avoidance processor 136 to deform an image to be formed in an image drawing area of the light modulator 130.

Figure 5:
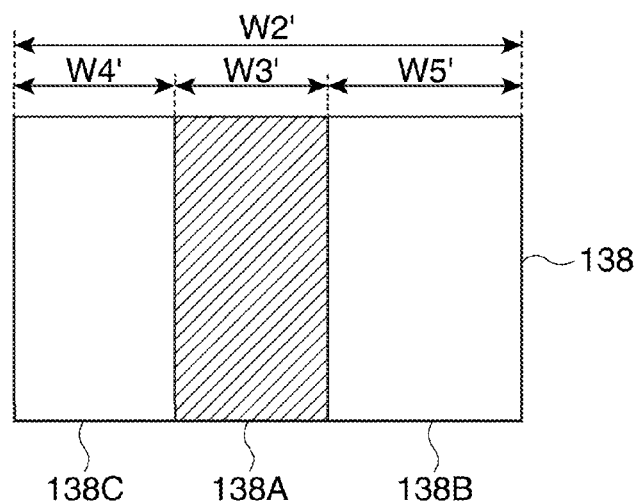
FIG. 5 is a diagrammatic view of a display area of a light modulator.

FIG. 5 is a diagrammatic view of an image formation area 138 of the light modulator 130.

The image formation area 138 shown in FIG. 5 is an area where an image is formed by pixels arranged in a matrix in a liquid crystal panel, a DMD, or any other device provided in the light modulator 130, and the image formed in the image formation area 138 modulates the light outputted from the illumination system 140.

The avoidance projection controller 125 sets an avoidance area 138A in the image formation area 138 based on the size W2 of the image light projection range in the position of the person 240, who is an obstacle, and the size W3 between the positions P1 and P2 of the two ends of the person 240. Portions of the image formation area 138 other than the avoidance area 138A form image drawing areas 138B and 138C where images are formed. Since the person 240 divides the projectable area of the screen SC into two in the present embodiment, there are two image drawing areas 138B and 138C. On the other hand, there is one image drawing area, for example, when an obstacle is positioned at an end of the screen SC. The position of the avoidance area 138A is determined based on the positions P1 and P2 of the two ends of the person 240, and the width of the avoidance area 138A is determined by the ratio between the size W2 and the size W3. That is, the ratio between the size W3' of the avoidance area 138A and the size W2' of the image formation area 138 is equal to the ratio between the size W3 and the size W2.

The avoidance projection controller 125 determines whether or not image shrinkage is required and the shrinkage factor based on the sizes W4' and W5' of the image drawing areas 138B and 138C and the size W2' of the entire image formation area 138. The image shrinkage factor is determined, for example, by (W4'+W5')÷W2'.

The avoidance projection controller 125 then controls the avoidance processor 136 to divide an image inputted from the A/D converter 110 based on the position of the avoidance area 138A and shrinks the divided images in the horizontal direction based on the shrinkage factor described above to produce images to be disposed in the image drawing areas 138B and 138C. When the light modulator driver 132 draws the shrunk images in the light modulator 130, projected images 211 and 212 (FIG. 3B) that avoid the person 240 are projected on the screen SC.

When the person 240 is positioned at an end of the screen SC as described above or positioned in a predetermined range that can be considered to be an end of the screen SC, the avoidance area 138A is set at one end of the image formation area 138, and one image drawing area 138B adjacent to the avoidance area 138A is set. In this case, the avoidance projection controller 125 instructs the avoidance processor 136 not to divide an image but to simply shrink and locate the image.

The process of shrinking an image refers, for example, to a process of resizing the image in order to draw the image with a smaller number of pixels.

Figure 6:
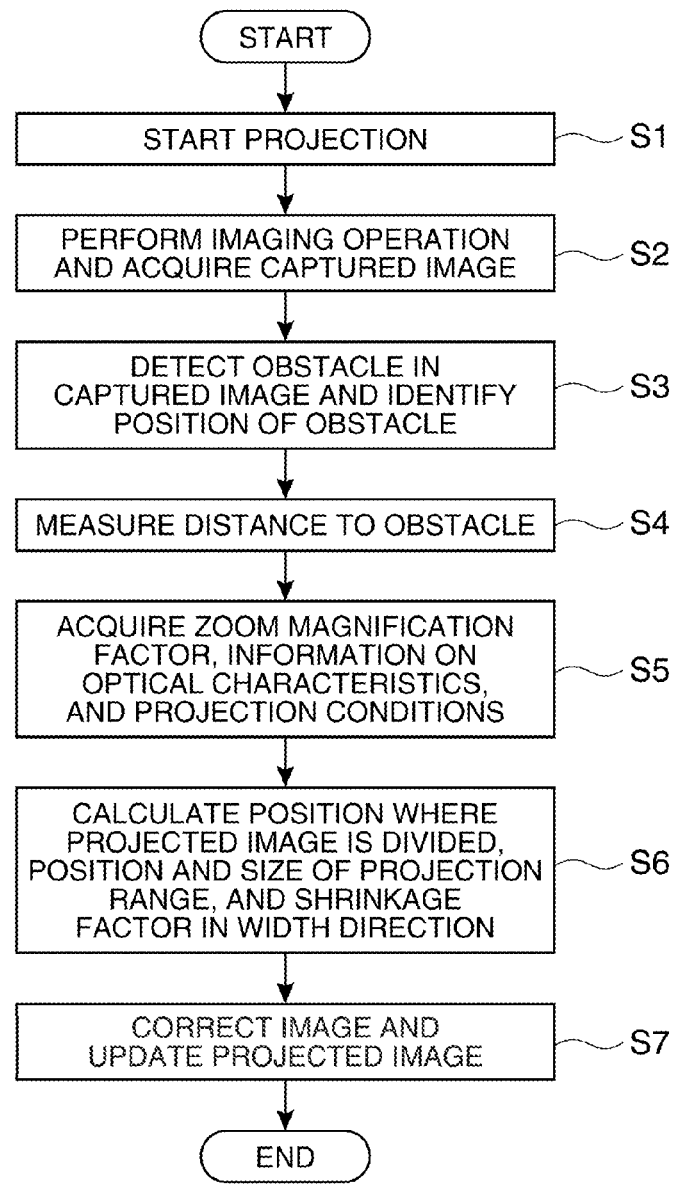
FIG. 6 is a flowchart showing the operation of the projector.

FIG. 6 is a flowchart showing the operation of the projector 100 and shows the avoidance projection.

After the projector 100 starts projection (step S1) and projects an image on the screen SC, and the user operates the operation section 195 or the remote control 191 to instruct the projector 100 to perform the avoidance projection, the projector 100 starts the avoidance projection.

In the avoidance projection, the CPU 120 in the projector 100 controls the imager 180 based on the function of the imaging operation controller 122 to perform imaging operation and acquires captured image data from the captured image memory 182 (step S2).

The CPU 120 subsequently detects an obstacle contained in the captured image based on the function of the obstacle detector 123 and, when an obstacle is detected, identifies the position of the obstacle in the captured image (step S3).

The CPU 120 then controls the distance measurement section 197 based on the function of the distance measurement controller 124 to measure the distance to the obstacle (step S4).

The CPU 120 further uses the function of the avoidance projection controller 125 to acquire the zoom magnification factor of the projection system 150, the information on optical characteristics of the projector 100, and the projection conditions (step S5) and determine what attributes of an image to be projected are corrected in the correction process based on the information described above (step S6). That is, when the avoidance processor 136 divides an image inputted from the A/D converter 110 as described above, the avoidance projection controller 125 determines the position where the image is divided. Further, when the image needs to be shrunk in the width direction, the avoidance projection controller 125 determines the shrinkage factor and further determines the position and size of a projectable area that avoids the obstacle. The CPU 120 then performs image drawing in the image formation area 138 as shown in FIG. 5, updates the projected image on the screen SC (step S7), and completes the procedure.

After the procedure shown in FIG. 6 is completed and when the obstacle is not appropriately avoided, the user operates the remote control 191 or the operation section 195 to instruct the projector 100 to perform the avoidance projection again.

As described above, according to the embodiment to which the invention is applied, the projector 100, which modulates the light outputted from the illumination system 140 and projects the modulated image light on the screen SC, includes the obstacle detector 123, which determines the position of an obstacle that blocks image light projection, the distance measurement controller 124, which determines the distance to the obstacle, and the avoidance projection controller 125, which determines an avoidance area where the obstacle prevents the image light from reaching the screen SC based on the position of the obstacle determined by the obstacle detector 123 and the distance to the obstacle determined by the distance measurement controller 124 and projects the image light in an area other than the avoidance area. The projection can therefore be so performed that the projected image itself or information carried by the image are entirely visible without any loss.

Since projection can be performed without any image truncation even when a person or an object that blocks projection light (image light) is present in the vicinity of the screen SC, no situation in which characters or any other objects contained in an image are not visible will occur. A person who is looking at the screen SC can therefore grasp all information contained in the projected image.

Therefore, for example, even when a presenter who uses the projector 100 stands in front of the screen SC, the body of the presenter will not block image projection. In this case, the presenter can make presentation without being careful about the position where the presenter is standing, whereby it is expected that the convenience of the presenter is improved.

Further, since an object that can be an obstacle can be present between the screen SC and the projector 100, the degree of freedom in installing the projector 100 increases.

Further, since the projector 100 includes the light modulator 130, which forms an image to be projected and uses the formed image to modulate the light outputted from the illumination system 140, and the avoidance projection controller 125 deforms the entire image formed by the light modulator 130 in such a way that the deformed image avoids the avoidance area and projects the image light in an area other than the avoidance area, the area where the obstacle blocks image light projection can be readily avoided by performing the image processing described above on the image formed by the light modulator 130.

Further, the avoidance projection controller 125 divides the image formed by the light modulator 130 into a plurality of images and projects the divided images in areas on both sides of the avoidance area. Therefore, even when the area where the obstacle blocks the image light projection is located in a primary position of the screen SC, such as in a position exactly in front of the projector 100, the image light can be projected in an area other than this area in such a way that all information contained in the projected image is visible.

Further, the avoidance projection controller 125 shrinks the image formed by the light modulator 130 in the horizontal direction. For example, when a person is standing in front of the screen SC as shown in FIG. 3B, the image light projection is blocked in the vertical direction of the screen SC. Even when an elongated obstacle extending in the vertical direction of the screen SC is present as described above, setting an avoidance area extending in the vertical direction of the screen SC and projecting an image not in the avoidance area but in areas on both sides thereof allows the projected image to be entirely visible.

Further, the projector 100 includes the imager 180, which captures an image of the screen SC, the obstacle detector 123 determines the position of an obstacle based on the image captured by the imager 180, and the avoidance projection controller 125 determines an avoidance area where the obstacle prevents the image light from reaching the screen SC based on the position of the obstacle in the captured image and the distance to the obstacle determined by the distance measurement controller 124. The area of the screen SC that is hidden by the obstacle and where the projection is blocked can therefore be accurately identified. As a result, the projection can be so performed that any influence of the obstacle can be reliably eliminated and a projected image is entirely visible.

The embodiment described above is only an example of a specific aspect to which the invention is applied and does not intend to limit the scope of the invention, and the invention is applicable to an aspect different from the above embodiment. For example, the above embodiment, in which no trapezoidal distortion correction is made, has been described with reference to the case shown in FIG. 5 where the entire image formation area 138 of the light modulator 130 is used to project an image to be projected, but the invention is not limited to the embodiment described above. The avoidance projection can alternatively be performed after trapezoidal distortion correction is made. In this case, the procedure described above can be carried out in the same manner except that in a trapezoidal distortion correction process, the avoidance areas 138A, and the image drawing areas 138B and 138C are formed in a trapezoidal image drawable area formed in the image formation area 138.

Further, the above embodiment has been described with reference to the case where the projector 100 installed in front of the screen SC projects an image forward, but the invention is not limited thereto. The invention is also applicable to a configuration in which the screen SC is formed of a transmissive screen and the projector 100 projects an image from the rear side of the screen SC. In this case, the projection can be so performed that an obstacle present between the projector 100 and the screen SC, that is, on the rear side of the screen SC is avoided.

Further, the above embodiment has been described with reference to the configuration in which the imager 180 includes the CCD camera 181 that accommodates a CCD image sensor, but the invention is not limited thereto. The image sensor in the imager 180 may be a CMOS sensor.

Further, a control program, setting values, and other data stored in the ROM 170 in the above embodiment can alternatively be stored in a mobile recording medium, or the projector 100 can alternatively download the program, setting values, and data from another apparatus connected the projector 100 via a communication network.

Further, each of the functional components of the projector 100 shown in FIG. 2 shows a functional configuration and is not necessarily implemented in a specific manner. That is, hardware corresponding to each of the functional components is not necessarily implemented, but it is, of course, possible for a single processor to execute a program to achieve the functions of the plurality of functional components. Further, part of the functions achieved by software in the above embodiment may be achieved by hardware, or part of the functions achieved by hardware in the above embodiment may be achieved by software. In addition, the specific detailed configurations of the projector 100 can be arbitrarily changed to the extent that the change does not depart from the substance of the invention.

What is claimed is:

1. A projector that modulates light emitted from a light source and projects the modulated image light on a projection surface, the projector comprising:
   an object detection unit for determining a position of an object that blocks projection of the image light;
   a distance detection unit for determining a distance to the object;
   a projection control unit for determining an avoidance area where the object prevents the image light from reaching the projection surface based on the position of the object determined by the object detection unit and the distance to the object determined by the distance detection unit and projecting the image light in an area other than the avoidance area; and
   a modulation unit for forming an image to be projected and modulating the light emitted from the light source based on the formed image,
   wherein the projection control unit deforms the entire image formed by the modulation unit in such a way that the deformed image avoids the avoidance area, and the projection control unit projects the image light in an area other than the avoidance area.

2. The projector according to claim 1,
   wherein the projection control unit divides the image formed by the modulation unit into a plurality of images and projects the image light in areas other than the avoidance area.

3. The projector according to claim 1,
   wherein the projection control unit shrinks the image formed by the modulation unit to project the image light in an area other than the avoidance area.

4. The projector according to claim 1,
   further comprising an imaging unit for capturing an image of the projection surface,
   wherein the object detection unit determines the position of the object that blocks the projection of the image light based on the image captured by the imaging unit, and
   the projection control unit determines the avoidance area where the object prevents the image light from reaching the projection surface based on the position of the object in the captured image and the distance to the object determined by the distance detection unit.

5. A method for projecting an image from a projector that modulates light emitted from a light source and projects the modulated image light on a projection surface, the method comprising:
   determining a position of an object that blocks projection of the image light;
   determining a distance to the object;
   determining an avoidance area where the object prevents the image light from reaching the projection surface based on the position of the object and the distance to the object;
   forming an image to be projected and modulating the light emitted from the light source based on the formed image; and
   projecting the image light in an area other than the avoidance area,
   wherein the forming step deforms the entire image in such a way that the deformed image avoids the avoidance area, and the projecting step projects the image light in the area other than the avoidance area.

6. The method according to claim 5, wherein the forming step divides the image into a plurality of images and the projecting step projects the image light in areas other than the avoidance area.

7. The method according to claim 5, wherein the forming step shrinks the image to project the image light in the area other than the avoidance area.

8. The method according to claim 5, further comprising: capturing an image of the projection surface, wherein the determining step determines the position of the object that blocks the projection of the image light based on the captured image, and the determining step determines the avoidance area where the object prevents the image light from reaching the projection surface based on the position of the object in the captured image and the distance to the object.

9. A projector that modulates light emitted from a light source and projects the modulated image light on a projection surface, the projector comprising:

an object detection unit for determining a position of an object that blocks projection of the image light;

a distance detection unit for determining a distance to the object;

a projection control unit for determining an avoidance area where the object prevents the image light from reaching the projection surface based on the position of the object determined by the object detection unit and the distance to the object determined by the distance detection unit and projecting the image light in an area other than the avoidance area; and a modulation unit for forming an image to be projected and modulating the light emitted from the light source based on the formed image, wherein the projection control unit shrinks the image formed by the modulation unit to project the image light in the area other than the avoidance area.

* * * * *